(12) United States Patent
Matsubayashi

(10) Patent No.: US 7,417,761 B2
(45) Date of Patent: Aug. 26, 2008

(54) INFORMATION PROCESSING APPARATUS AND INFORMATION PROCESSING METHOD FOR PROCESSING DOCUMENT DATA HAVING A PLURALITY OF OBJECTS DIFFERENT IN ATTRIBUTION

(75) Inventor: Kazuhiro Matsubayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 11/346,385

(22) Filed: Feb. 3, 2006

(65) Prior Publication Data
US 2006/0126084 A1 Jun. 15, 2006

Related U.S. Application Data

(62) Division of application No. 09/471,162, filed on Dec. 23, 1999, now Pat. No. 7,113,305.

(30) Foreign Application Priority Data

Dec. 28, 1998 (JP) ............................. 10-374393
Dec. 9, 1999 (JP) ............................. 11-350083

(51) Int. Cl.
*G06F 15/00* (2006.01)

(52) U.S. Cl. .................. 358/1.2; 358/528; 358/472
(58) Field of Classification Search ........... 358/1.2, 358/1.9, 1.13, 1.18, 528, 472
See application file for complete search history.

(56) References Cited

U.S. PATENT DOCUMENTS

| 5,136,399 | A | | 8/1992 | Aoyama | 356/296 |
|---|---|---|---|---|---|
| 5,148,295 | A | | 9/1992 | Matsubara | 358/451 |
| 5,613,017 | A | | 3/1997 | Rao et al. | 382/174 |
| 5,796,877 | A | | 8/1998 | Gusmano | 382/298 |
| 5,896,470 | A | | 4/1999 | Miyaza | 382/298 |
| 5,999,767 | A | * | 12/1999 | Ando | 399/85 |
| 6,169,544 | B1 | * | 1/2001 | Onoda | 715/723 |

* cited by examiner

*Primary Examiner*—Edward L. Coles
*Assistant Examiner*—Chan S Park
(74) *Attorney, Agent, or Firm*—Fitzpatrick, Cella, Harper & Scinto

(57) ABSTRACT

Document data is constituted of a plurality of objects different in attribution, and layout information of the objects. Each object is associated with size information indicating a relation between an output area size and an object size when the document data is outputted. When the document data is outputted to an output apparatus, the magnification of each object is changed and outputted in accordance with the output area size of the document data.

6 Claims, 14 Drawing Sheets

FIG. 4
Welcome Party
Join the welcome party of Mr. Yamada:
Date 6:00pm-8:00pm, April3
Place Cafe Taro
Charge 5000YEN
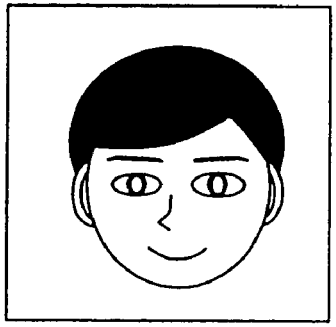
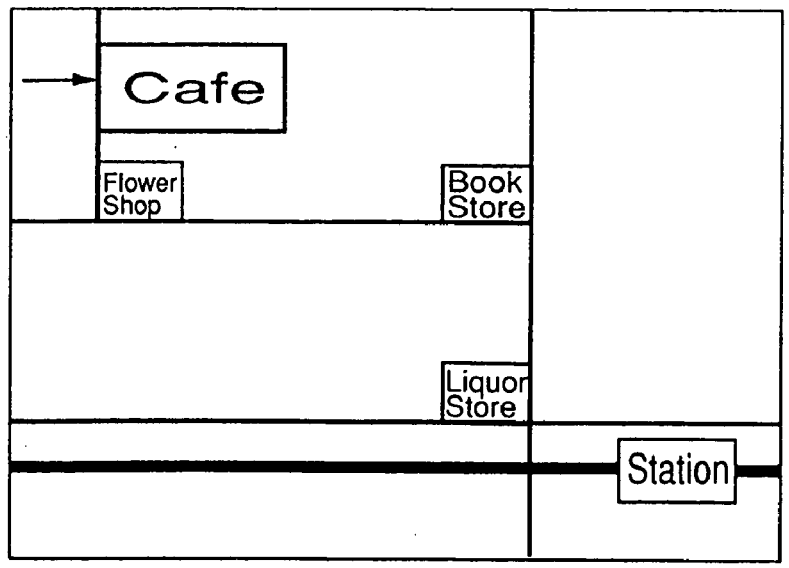

INFORMATION PROCESSING APPARATUS AND INFORMATION PROCESSING METHOD FOR PROCESSING DOCUMENT DATA HAVING A PLURALITY OF OBJECTS DIFFERENT IN ATTRIBUTION

This application is a divisional application of application Ser. No. 09/471,162, filed Dec. 23, 1999, pending.

BACKGROUND OF THE INVENTION

1. Field of the Invention

The present invention relates to an information processing apparatus and an information processing method, particularly to an information processing apparatus and an information processing method for controlling output of a plurality of objects different in attribution to a display apparatus, a printing apparatus, and other output devices so that the objects are appropriately arranged.

2. Related Background Art

In a conventional art, a document having objects different in attributions such as a character, a diagram and an image is prepared and outputted in a document processing apparatus, and the like.

FIG. 20 is a view showing one example of data prepared in this type of document processing apparatus.

In FIG. 20, numeral 51 denotes a character object layout, and is prepared, for example, as "Welcome party". Numeral 52 denotes a diagram object and shows, for example, map information of a welcome party place. Numeral 53 denotes an image object, for example, in which a welcome party host's face is laid out. A layout processing of each object will be described hereinafter.

Additionally, the sizes of the entire document and each object are stored as document layout information in a document file. The size is represented by a length unit or a pixel number unit. Examples of the length unit include millimeter, inch (about 25.4 millimeters), point (1/72 inch), and the like. Moreover, the longitude and latitude of a map, and another unit which can be converted to the length unit are used in some cases.

Here, for the object size, in a character object, the width and height of a character are indicated. In a diagram object, the width and height of a diagram and the thickness of a line constituting the diagram are indicated. In an image object, the width and height of an image are indicated.

Moreover, when the document is outputted to a display or a printer, the designated area of a designated page can be outputted. The display or the printer has resolution information which is represented by the number of pixels per unit length.

Furthermore, the sizes of the document and each object stored in the document file which are represented by the length unit are converted to the pixel number unit by a user's operation when the resolution of the output apparatus is determined. Additionally, the document output magnification can be designated by the user's operation during the output.

The unit by which the size of the document stored in the document file and the sizes of all the objects are represented needs to be unified as either "the length" or "the number of pixels" so that even when the document is outputted to the display or printer of any resolution, the document has the same layout.

Generally, for the document with a final purpose of the output by the printer, after the size (length unit) of a sheet for the output is determined, the document is prepared. Therefore, to maintain the layout, the size of each object needs to be represented by the length unit.

On the other hand, for the document with a final purpose of the output to the display, since the display quality of the object is influenced by the number of pixels, rather than by the length unit size, the size of the entire document and the size of each object are represented by the number of pixels in many cases.

When the layout may differ by the display and the printer for the output, each object can freely be represented by either the length unit or the pixel number unit.

In the conventional document processing system, each object is outputted with the size obtained by multiplying the size of each object stored in the document file by the document output magnification.

For example, when the resolution of the display is 72 dpi (72 pixels per inch) and the document output magnification is 100%, and when the size of a certain character object is 12 points in length and width, this character object is displayed with 12 pixels in length and width. When the document output magnification is 50%, the character object is displayed with six pixels in length and width.

Moreover, when the resolution of the display is 96 dpi (96 pixels per inch) and the document output magnification is 100%, and when the size of a certain character object is 12 points in length and width, this character object is displayed with 16 pixels in length and width. When the document output magnification is 50%, the character object is displayed with eight pixels in length and width.

In the conventional document processing apparatus, during the reduction and output of the document, when the object output size is excessively small, it becomes difficult for the user to refer to the object output result and distinguish the information.

Moreover, in some cases, it is easier to see the output result when only the important information is clearly outputted and other information is erased, than when many objects with non-distinguishable information are congested and present in a reduced small document area.

Additionally, as one example of the conventional document processing apparatus or document processing system, control is performed so that the object reduced to a size less than a predetermined size is prevented from being outputted among the objects, so that the output result can be seen more easily.

Moreover, as another example of the conventional document processing system, the object is outputted with a constant size irrespective of the enlargement/reduction of the document, so that the object information can constantly be distinguished.

However, in the conventional document processing system, there is a problem that a fine output size cannot be designated in an arbitrary object unit.

Moreover, in the conventional document processing system, there is a problem that a fine output size cannot be designated in an arbitrary enlargement/reduction magnification.

SUMMARY OF THE INVENTION

The present invention has been developed to solve the above-described problems, and an object thereof is to provide an information processing apparatus and method in which operating properties are enhanced by changing and outputting the size of an object in accordance with the size of document data when this document data is outputted.

To achieve the above-described object, according to the present invention, there is provided an information processing apparatus which comprises area size determining means for determining the size of a document output area when document data is outputted to an output apparatus based on layout information, information memory means for storing size information indicating a relation of the size of the document output area and the size of an object included in the document data, object size determining means for determining the size of the object based on the size determined by the area size determining means and the size information stored in the information memory means, magnification changing means for changing the magnification of the object based on the size determined by the object size determining means, and control means for outputting the object with the magnification changed by the magnification changing means to the output apparatus.

Moreover, according to the present invention, there is provided an information processing apparatus which comprises layout information memory means for storing layout information when document data is outputted to an output apparatus, display control means for displaying an object included in the document data on a display screen, and associating means for associating the displayed object with size information indicating the size of a document output area and the size of the object when the document data is outputted to the output apparatus based on the layout information.

BRIEF DESCRIPTION OF THE DRAWINGS

FIG. 4 is a view showing output of a document file output in the embodiment.

DETAILED DESCRIPTION OF THE PREFERRED EMBODIMENTS

First Embodiment

Figure 1:
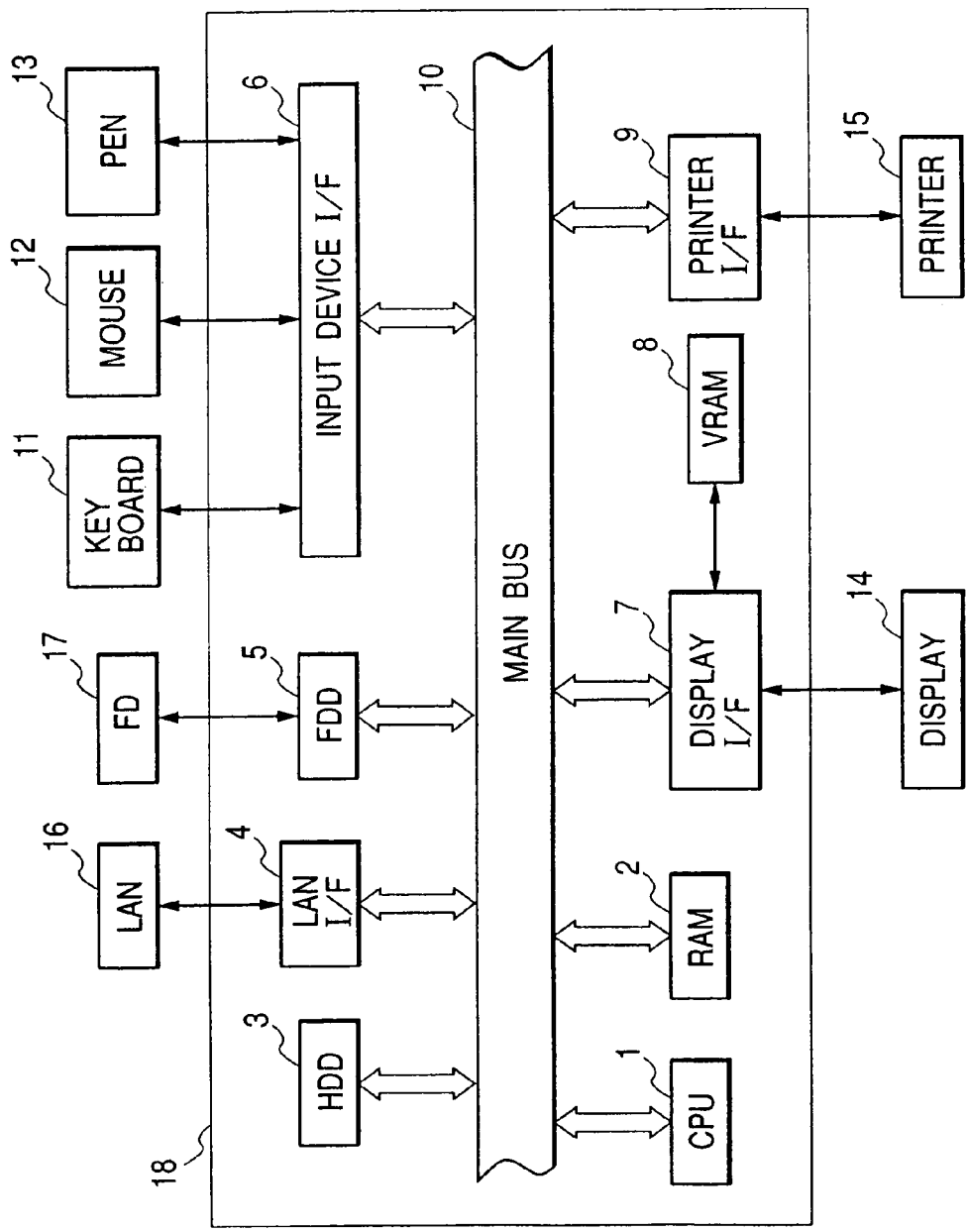
FIG. 1 is a block diagram showing the constitution of a computer system to which a document processing apparatus according to a first embodiment of the present invention can be applied.

FIG. 1 is a block diagram showing the constitution of a computer system to which a document processing apparatus according to a first embodiment of the present invention can be applied.

In a computer 18, a CPU 1 controls the whole of a computer 18 via a main bus 10. Furthermore, the CPU 1 carries out a series of processings such as document input, edition processing, and document output control in accordance with an instruction inputted from an input apparatus (e.g., keyboard 11, mouse 12, pen 13) via an input apparatus I/F 6. Document data and other information displayed on a screen are stored in VRAM 8, and displayed on a display 14 via a display I/F 7, or outputted to a printer 15 via a printer I/F 9.

A RAM 2 is loaded for storage with other control programs including OS to be executed by the CPU 1 and a control program for realizing the present invention. Moreover, the RAM functions as the operation area or the temporary save area of various data for use when the CPU 1 executes the control program.

HDD 3 is a memory apparatus for storing a relatively large amount of programs or data, and functions as a nonvolatile memory medium in which the programs or the data are not erased even when the power supply is cut off. LAN I/F 4 is an interface for exchanging data between the computer 18 and other peripheral apparatuses via LAN 16. Similarly, there may be provided an interface for exchanging data between the computer 18 and the other peripheral apparatuses via a telephone circuit.

FDD 5 is a floppy disk drive to write data, and the like to FD 17(floppy disk) and read the data, and the like from the FD 17. Moreover, the FDD can also exchange the data with other computers via the FD 17. Similarly, the FDD may be a memory apparatus for exchanging the data with the other computers via CD-ROM, MO, DVD or other attachable/detachable memory media such as other types of disks or tapes.

Additionally, a personal computer or another general-purpose computer may be used as the computer 18, or a microcomputer built in the apparatuses such as the display 14 and the printer 15 may be used.

The function constitution of the document processing apparatus in the present embodiment will be described hereinafter with reference to FIG. 2.

Figure 2:
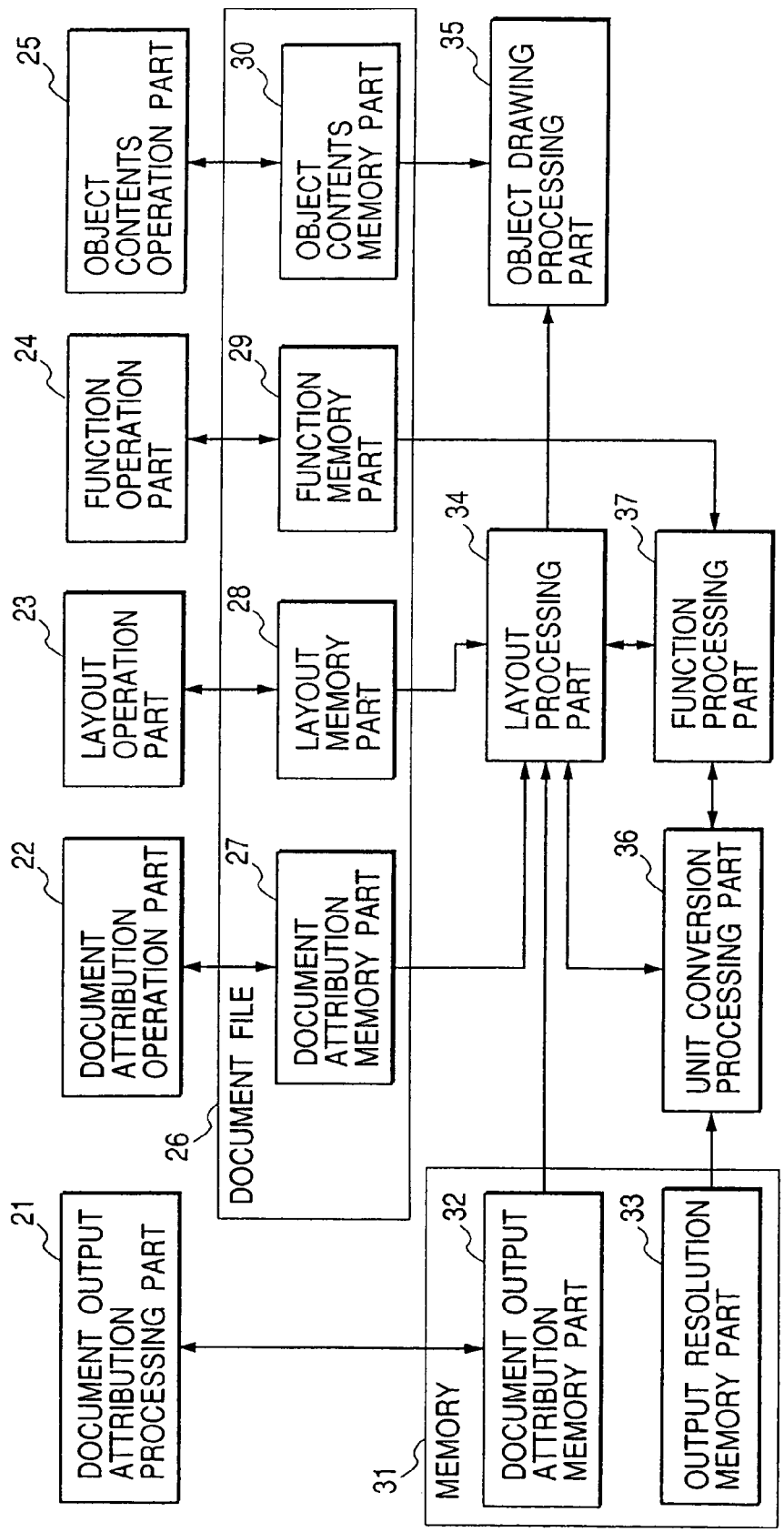
FIG. 2 is a block diagram showing the function constitution in the document processing apparatus shown in FIG. 1.

FIG. 2 is a block diagram showing the function constitution in the document processing apparatus shown in FIG. 1.

In FIG. 2, a document attribution memory part 27 stores the document attributions of the document file such as the document size and the number of pages. A layout memory part 28 stores layout information such as the position and size of each object.

A function memory part 29 stores functions as the characteristics of the embodiment. An object contents memory part 30 stores the contents of each object. These parts correspond to the HDD 3 and the RAM 2, and the information stored in each part forms a document file 26. These information are edited in a document attribution operation part 22, a layout operation part 23, a function operation part 24, and an object content operation part 25 (corresponding to the CPU 1), respectively, by the operation of the keyboard 11, the mouse 12, the pen 13, and the like.

Additionally, when the document is outputted to the output apparatuses such as the display 14 and the printer 15, the information of a document output page, output area, and output magnification are necessary. These information are processed in a document output attribution processing part 21 (corresponding to the CPU 1), and stored in a document output attribution memory part 32 in a memory 31 (corresponding to the RAM 2). Furthermore, when the document is outputted to the output apparatuses, the resolution information of the output apparatus is also necessary. The information is stored in an output resolution memory part 33 in the memory 31.

Figure 19:
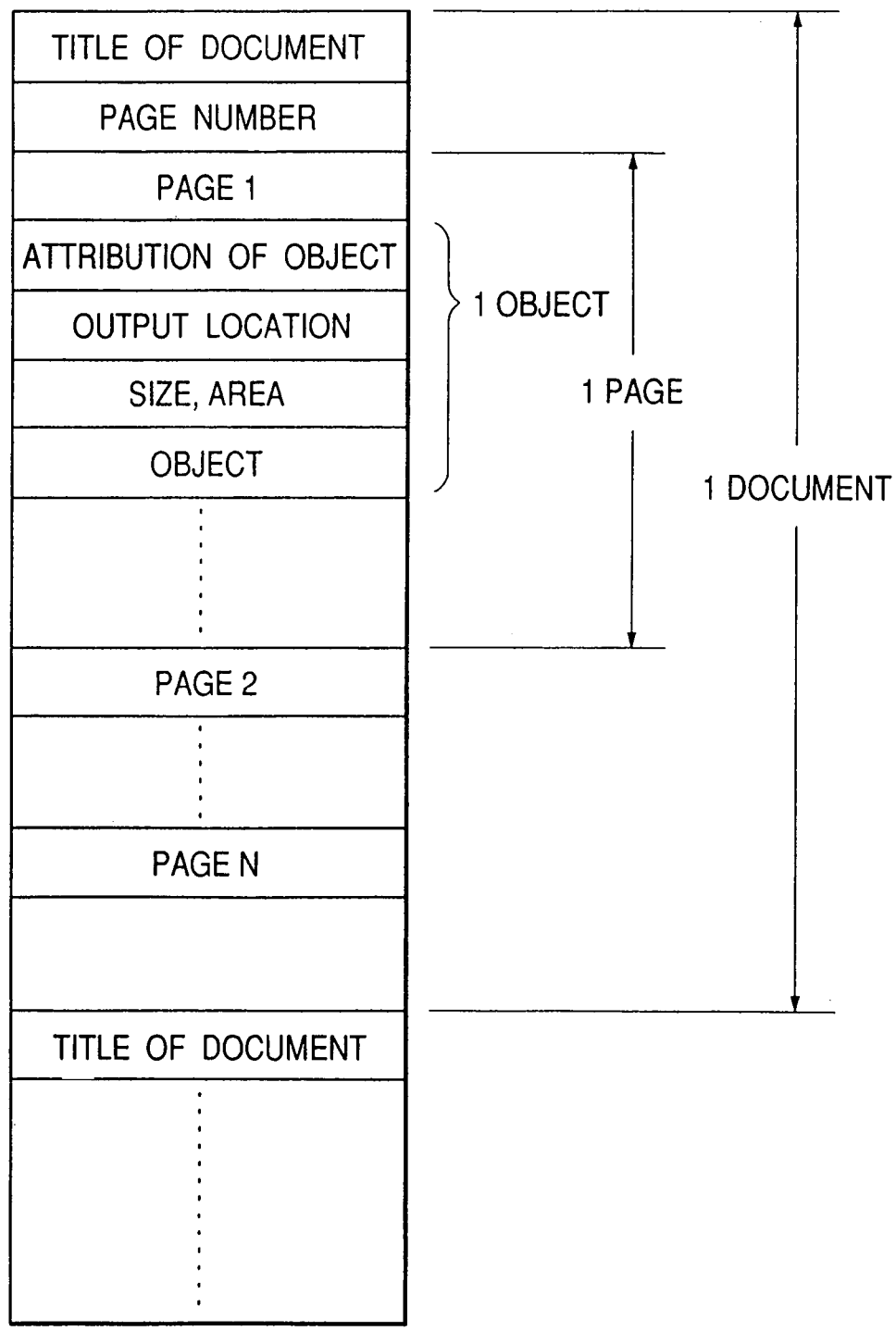
FIG. 19 is a view of a document file stored in a memory apparatus.

Here, the document file will be described. FIG. 19 is a view of a document file stored in the memory apparatus (RAM 2, HDD 3, FD 17). As shown in FIG. 19, one document file is constituted of a document file title, page number, and each page information. Each page information is constituted of each object information, and each object information is constituted of an object attribution, output location, size, area, and object (text information, diagram information, or image information). The object attributions include functions, importance of object degree, and the like.

A layout processing part 34 calculates the output position and size of each object. When the function is defined for the object, the object size is obtained by a function processing part 37. When the size is represented by the length unit, the size is converted to the pixel number unit based on the resolution of the output apparatus by a unit conversion processing part 36. These processing parts correspond to the CPU 1.

An object drawing processing part 35 (corresponding to the CPU 1 and the display I/F 7 or the printer I/F 9) draws each object on a pixel unit coordinate surface based on the resolution of the output apparatus. For example, the character object is drawn by reading font data in accordance with the character code and size. Moreover, when the font data matched with the size is not stored, the existing font data is enlarged/reduced.

Moreover, the diagram object is drawn by calculating the coordinate of points, lines, or faces constituting the diagram. Furthermore, the image object is drawn by reading pixel data and performing processings such as pixel interpolation and deletion in accordance with the size.

Figure 3:
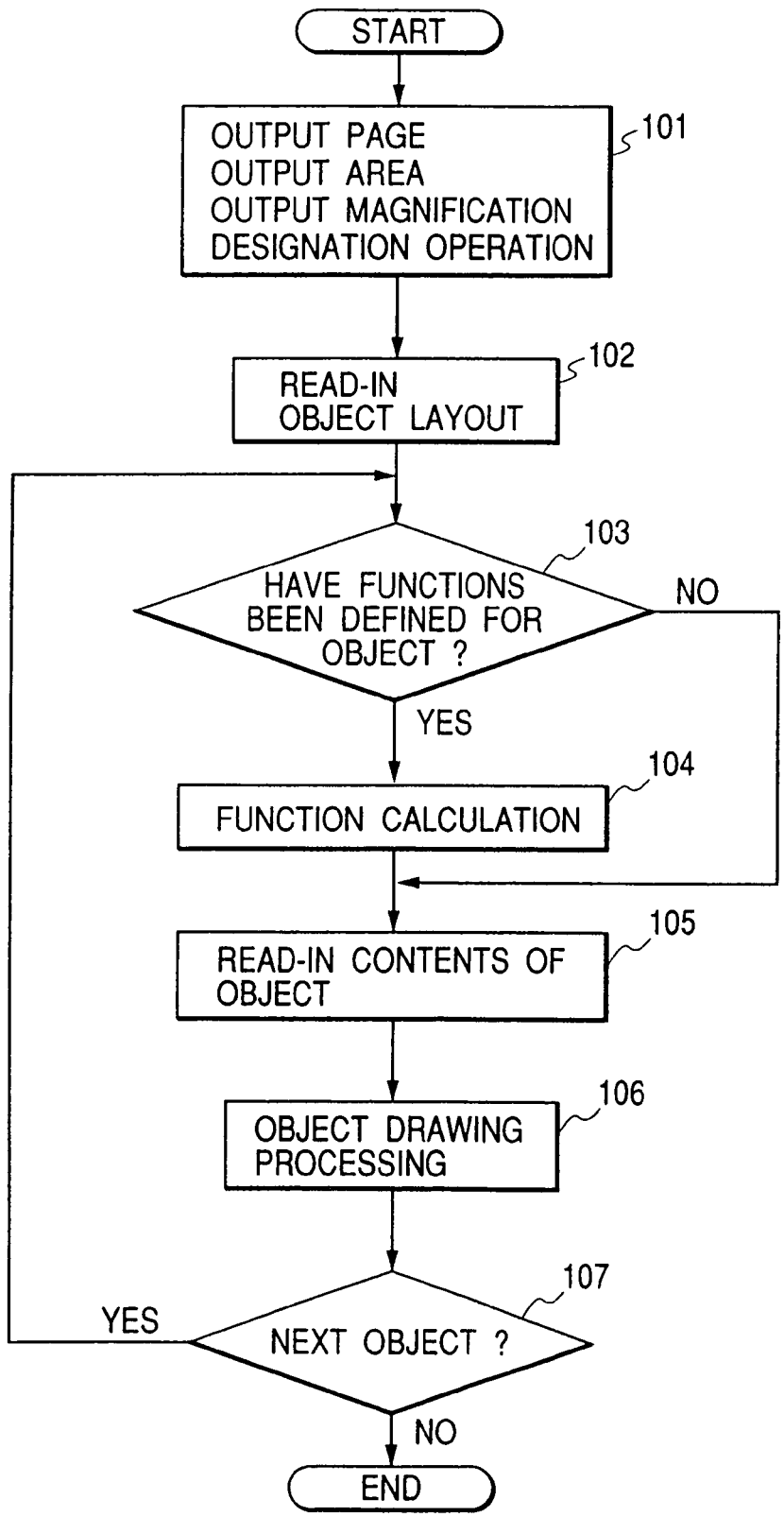
FIG. 3 is a flowchart showing one example of a data processing procedure in the document processing apparatus of the embodiment.

FIG. 3 is a flowchart showing one example of a data processing procedure in the document processing apparatus of the present embodiment, and shows a document output processing procedure. Additionally, (101) to (107) denote steps.

In step (101), an operation of designating an output page, output area, and output magnification is performed. Concretely, a desired document file is designated from a plurality of document files by a known technique. Based on this designation, the document output attribution processing part 21 determines the document file page to be outputted, the object area to be outputted to the output page, and the magnification of the document file size to be outputted. Next, in step (102), the layout processing part 34 reads the layout information of each object of the designated document file from the document file 26.

Subsequently, in step (103), the layout processing part 34 checks whether functions have been defined for each object, and when it is judged that the function is not defined, the procedure advances to step (105) and subsequent steps.

On the other hand, when it is judged in the step (103) that the function is defined, the procedure advances to step (104), in which the function processing part 37 calculates the object output size for the document output magnification based on the function defined in the object.

Next in step (105), the object drawing processing part 35 reads in the contents of the object from the document file 26. In step (106), the object drawing processing part 35 draws the object with the calculated output size, that is, the output size based on the function when the function is defined, or the output size based on the output magnification when the function is not defined. Subsequently, in step (107), the layout processing part 34 judges whether or not there is the next object, returns to the step (103) when judging that the next object is present, and completes the processing when judging that there is no next object.

Additionally, the function indicating the relation between the document display magnification and the object display size is defined for each object. Moreover, the common function cab be defined for a plurality of objects. Furthermore, as the method of selecting one object or a plurality of objects, there are a method of designating the objects in order with a pointing device, a method of designating retrieval conditions and selecting all the corresponding objects, and the like.

Thereby, output results are obtained as shown in FIG. 4.

Figure 20:
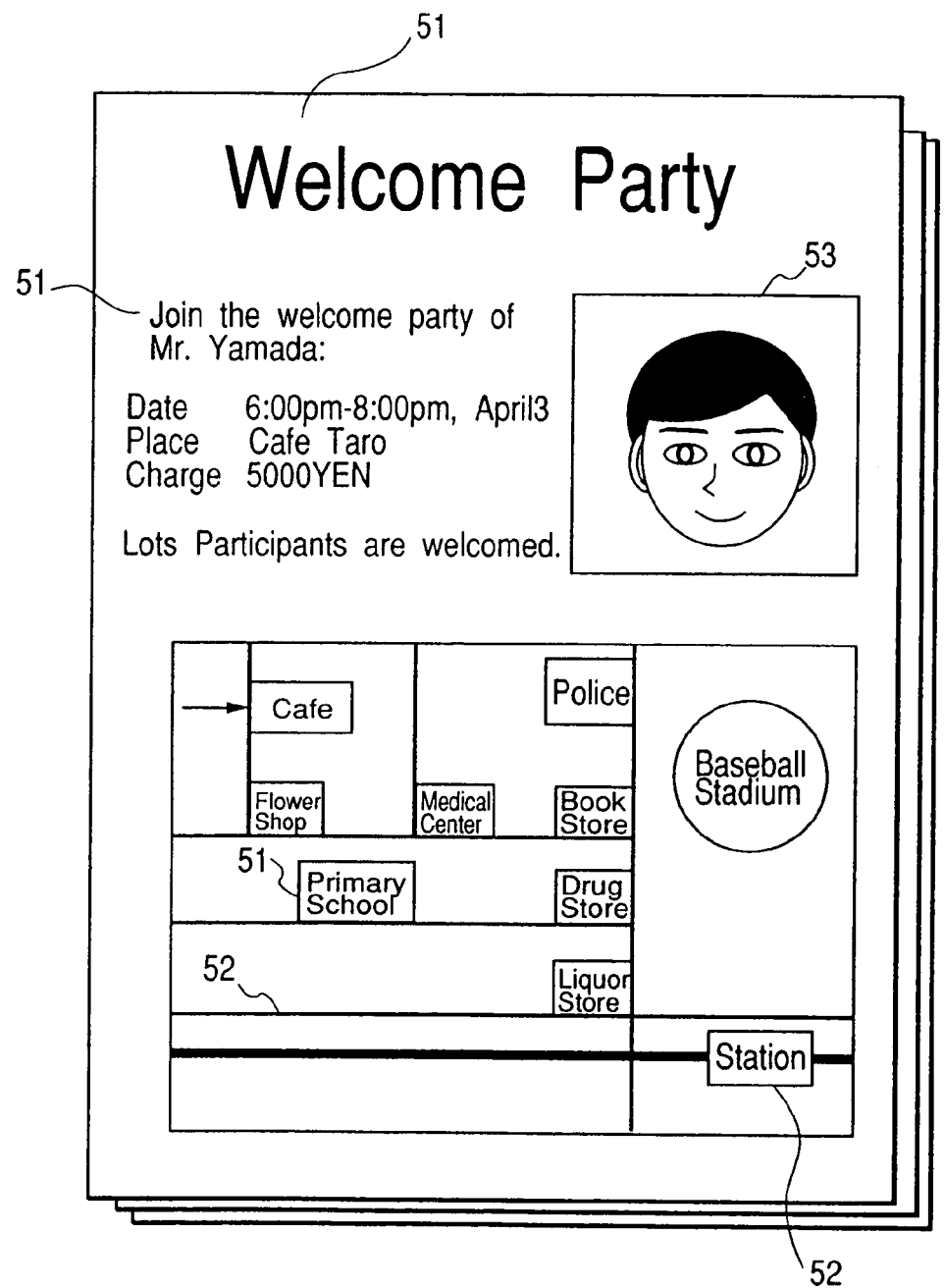
FIG. 20 is a view of the document file prepared in the document processing apparatus.

FIG. 4 shows an example in which one page of the document file shown in FIG. 20 is outputted with a ⅓ size. In FIG. 4, each object is outputted based on the object function. In this example, it can be seen that the diagram and text shown by an arrow are allotted with the function different from the function of the other diagram and text. Moreover, in this example, there is a certain object which is not outputted in comparison with FIG. 20. This is because the function of this object is zero with the ⅓ size.

A function setting processing operation by the function operation part 24 shown in FIG. 2 will be described hereinafter with reference to FIGS. 5 and 6.

Figure 5:
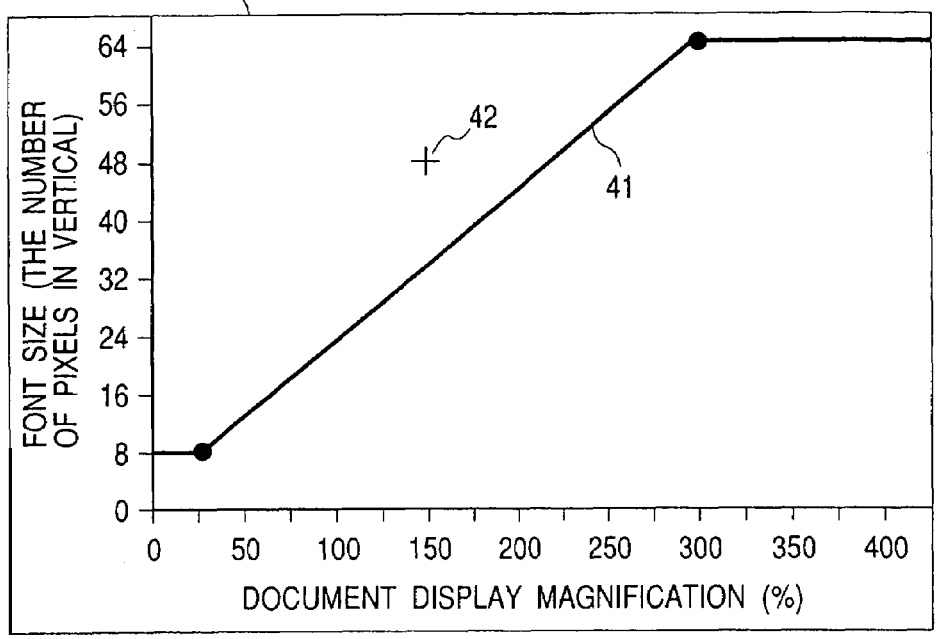
FIG. 5 is an explanatory view showing one example of a function setting screen by a function operation part shown in FIG. 2.
Figure 6:
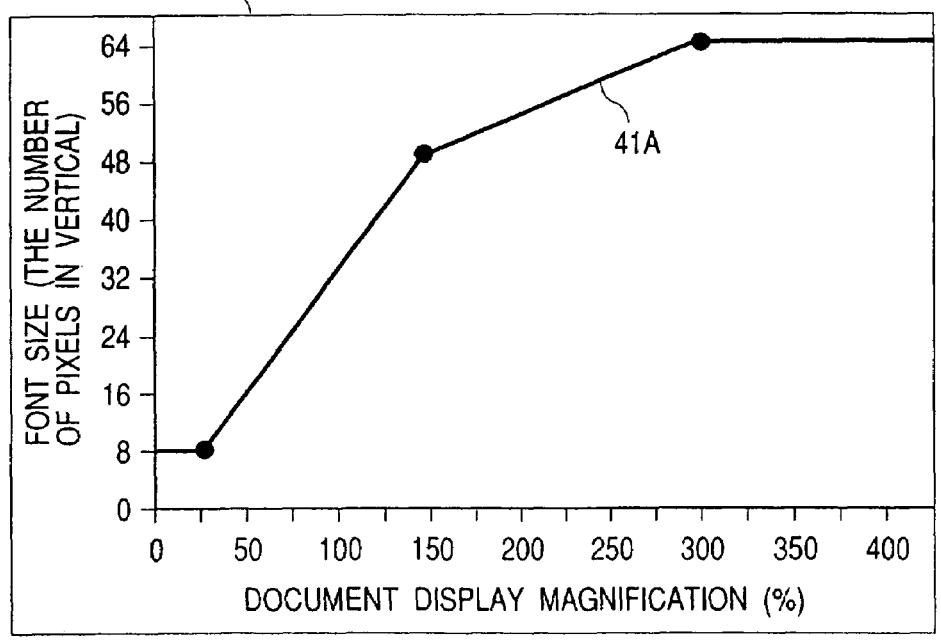
FIG. 6 is an explanatory view showing one example of the function setting screen by the function operation part shown in FIG. 2.

FIGS. 5 and 6 are explanatory views showing one example of a function setting screen by the function operation part 24 shown in FIG. 2 when the object is a character, and correspond, for example, to the state displayed in the display 14 shown in FIG. 1. Additionally, in the drawings, the axis of ordinate indicates a font size (vertical pixel number), and the axis of abscissa indicates a document display magnification (%). Moreover, numerical 42 denotes a function designation point, which is indicated by the pointing devices such as the mouse 12 and the pen 13. Additionally, the object size to be represented can be switched to the length unit or the pixel number unit in accordance with the user's instruction.

In the function operation part 24, for the selected object, a graph 41 showing the function as shown in FIG. 5 is displayed on the screen of the display 14. When the arbitrary point 42 on the graph is clicked with the pointing devices such as the mouse 12 and the pen 13, the graph 41 is changed to a graph 41A configured to pass through the function designation point 42 as shown in FIG. 6. Subsequently, the original function stored in the function memory part 29 is changed based on the changed graph 41A.

Additionally, the function may be prepared by a table or a formula instead of the graph. Moreover, for the object displayed on the screen in a certain document output magnification, enlargement/reduction is instructed, and the result may be reflected on the function. As the method of giving the instruction of enlargement/reduction, there are a method of dragging a handle displayed in the selected object, a method of directly inputting a numeric value and designating the size, a method of utilizing graphical user interface (GUI) tools such as an icon on the screen, and the like. Additionally, the examples of the GUI tool include a tool for selecting an icon of magnifying glass before clicking the object so that enlargement (or reduction) is performed.

The relation between the document output magnification and the object size during initial setting will be described hereinafter with reference to FIGS. 7 to 12.

FIGS. 7 to 12 are explanatory views showing the relation between the document output magnification and the object size stored in the function memory part 29 shown in FIG. 2 during the initial setting (in this example, the object is a character), the axis of ordinate indicates a font size (The Number Of Pixels In Vertical) and the axis of abscissa indicates a document display magnification (%).

Figure 7:
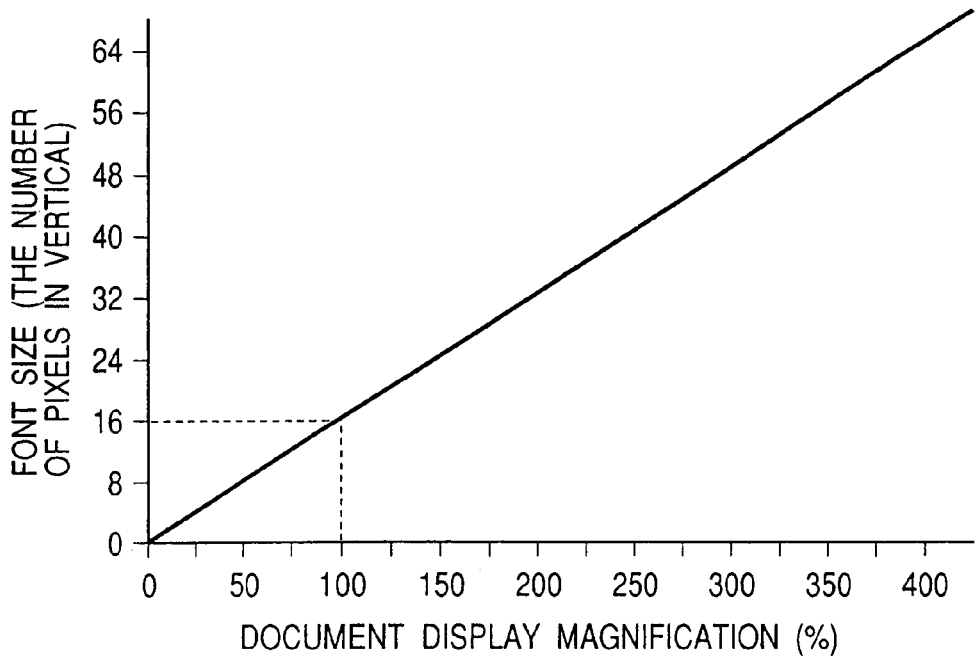
FIG. 7 is an explanatory view of a relation between a document output magnification and an object size stored in a function memory part shown in FIG. 2 during initial setting.
Figure 8:
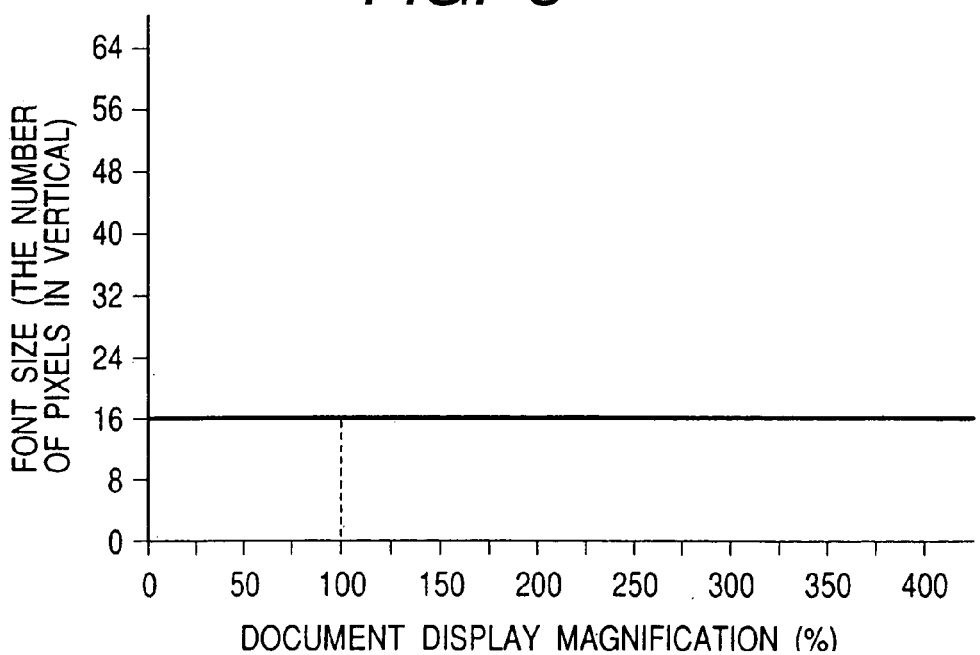
FIG. 8 is an explanatory view of the relation between the document output magnification and the object size stored in the function memory part shown in FIG. 2 during the initial setting.

First, in the initial setting when the document is newly prepared, the relation between the document output magnification and the object size is a proportional relation as shown in FIG. 7, and the layout is kept irrespective of the document output magnification. Furthermore, by defining the function so that the object size becomes constant irrespective of the document output magnification as shown in FIG. 8, the object information can be easily distinguished even when the document is reduced.

Figure 9:
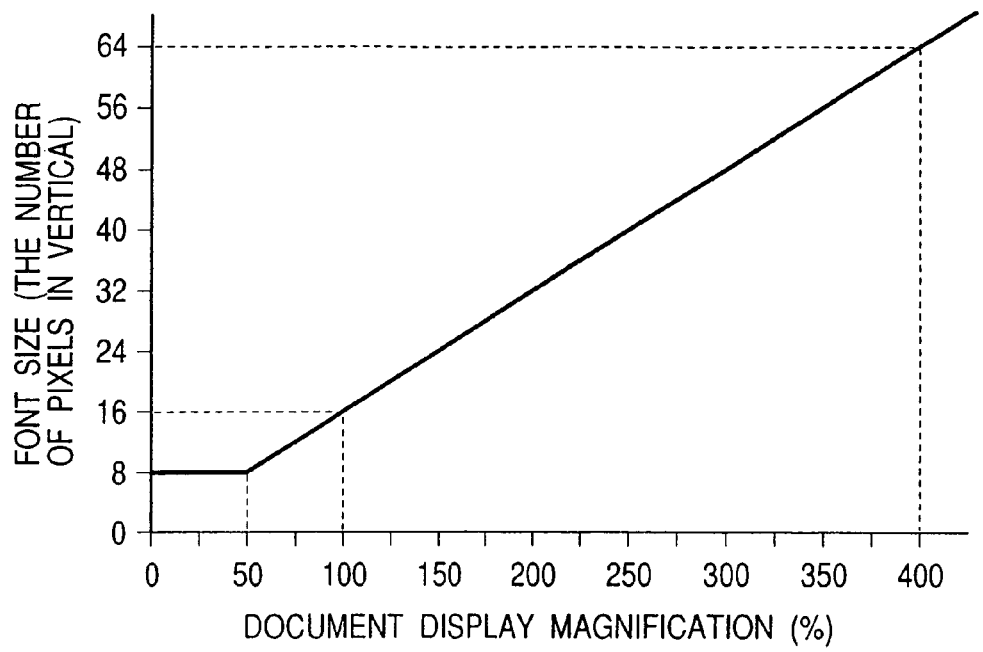
FIG. 9 is an explanatory view of the relation between the document output magnification and the object size stored in the function memory part shown in FIG. 2 during the initial setting.

A plurality of pages are frequently reduced to one display screen or one sheet and outputted, but as shown in FIG. 9, by establishing the proportional relation at a predetermined output magnification or more to keep the layout, and making the object size to be constant at the magnification less than the predetermined output magnification, it becomes easier to distinguish the information, which is practical.

Figure 10:
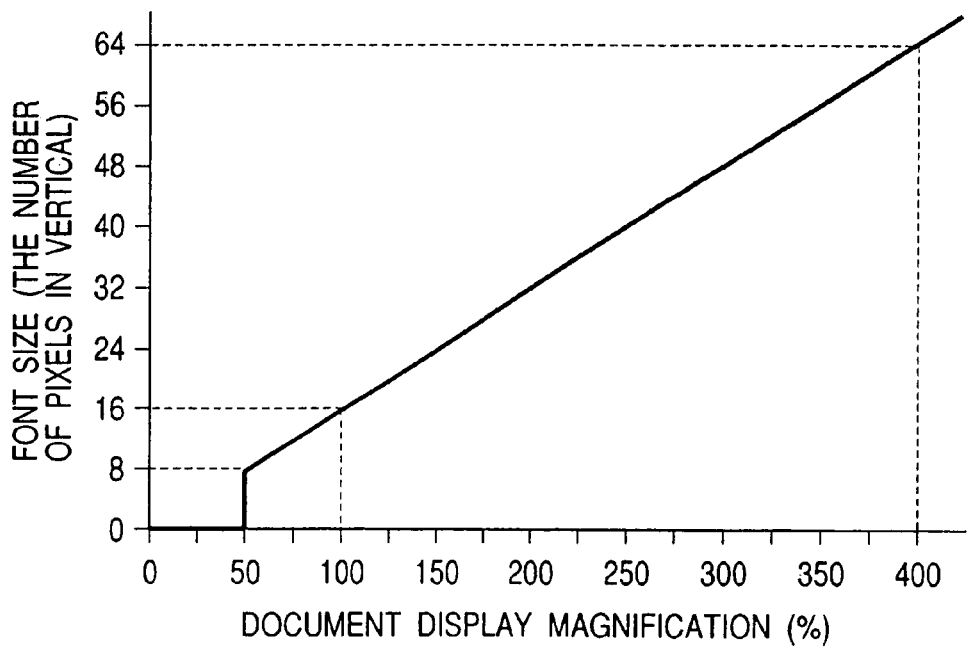
FIG. 10 is an explanatory view of the relation between the document output magnification and the object size stored in the function memory part shown in FIG. 2 during the initial setting.

However, when this function is applied to many objects, and when the document is reduced, the objects are congested and overlapped, thereby making it difficult to see the objects. Therefore, by setting the output size to be "zero" at the magnification less than the predetermined magnification as shown in FIG. 10 not to display the unimportant object, the objects are arranged to be easily seen.

Figure 11:
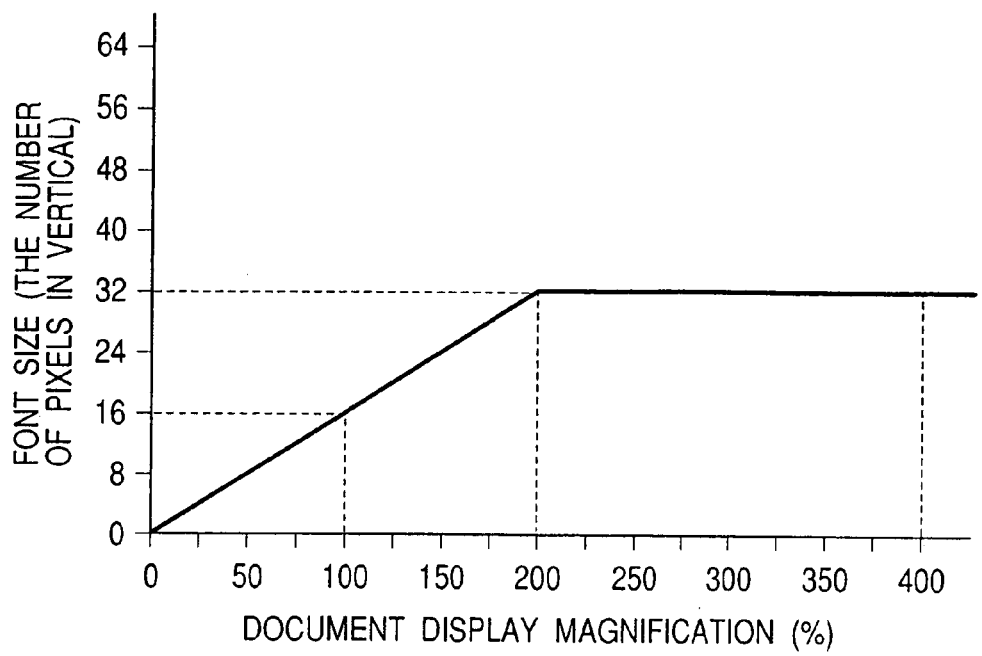
FIG. 11 is an explanatory view of the relation between the document output magnification and the object size stored in the function memory part shown in FIG. 2 during the initial setting.

Moreover, by making the object size to be constant at the predetermined output magnification or more as shown in FIG. 11, a space for displaying other information can be made so that the object is not unnecessarily enlarged.

Figure 12:
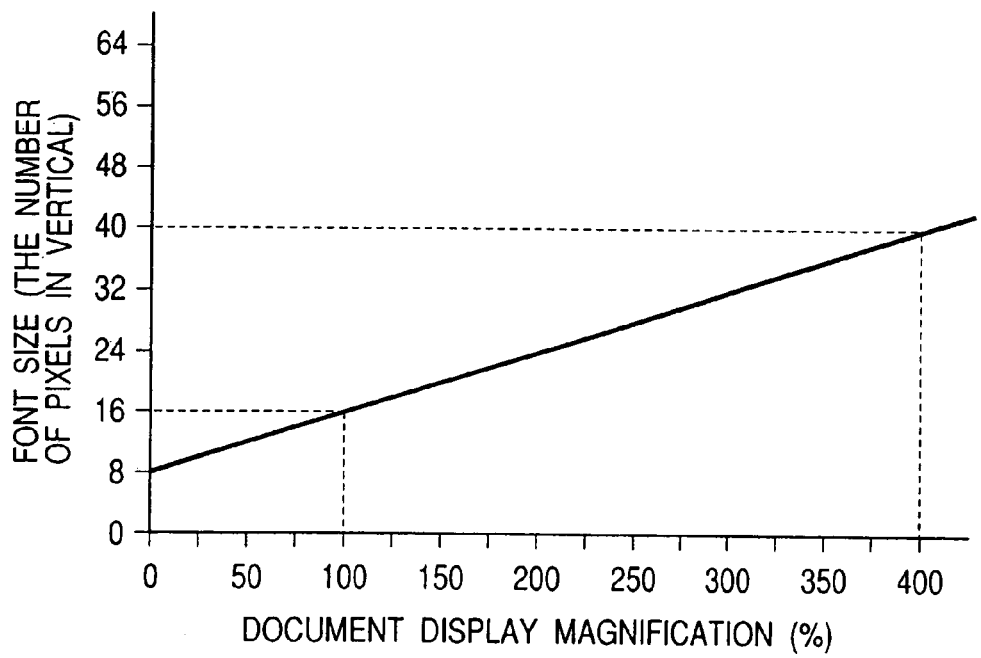
FIG. 12 is an explanatory view of the relation between the document output magnification and the object size stored in the function memory part shown in FIG. 2 during the initial setting.

Furthermore, in FIG. 12, the object is smoothly enlarged/reduced for the document enlargement/reduction, while the effects similar to those of FIGS. 9 and 11 are produced, so that a feeling of difference can be minimized. Thereby, the font size can be defined.

In FIGS. 7 to 12, the character object is shown as the object example, and the font size (The Number Of Pixels In Vertical) is shown as the object size example, but the function can similarly be defined for the other objects such as the diagram and the image. The object size may be represented by the pixel number unit or the length unit.

Figure 13:
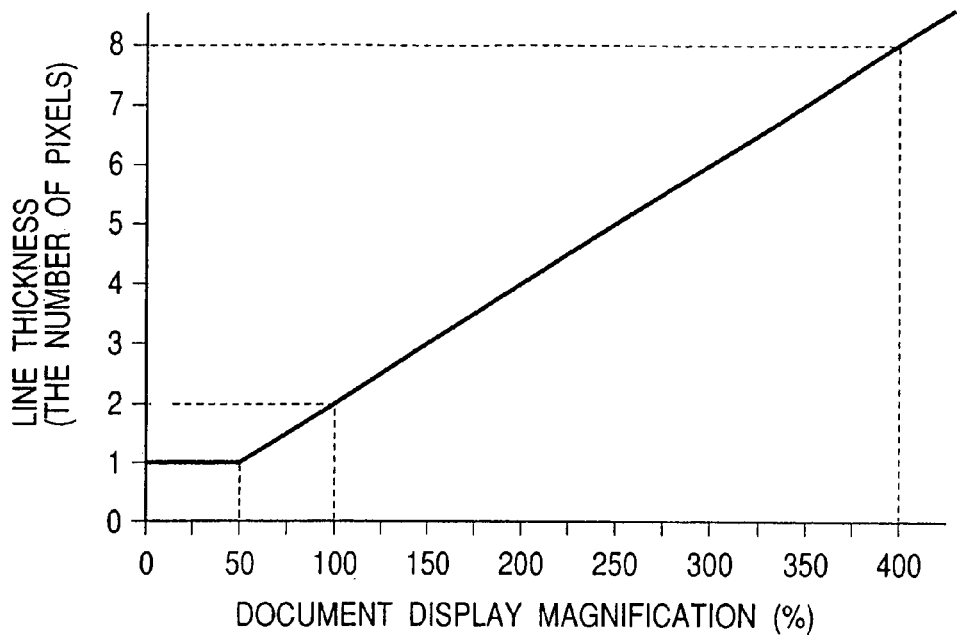
FIG. 13 is an explanatory view of the relation between the document output magnification and the object size stored in the function memory part shown in FIG. 2 during the initial setting.
Figure 14:
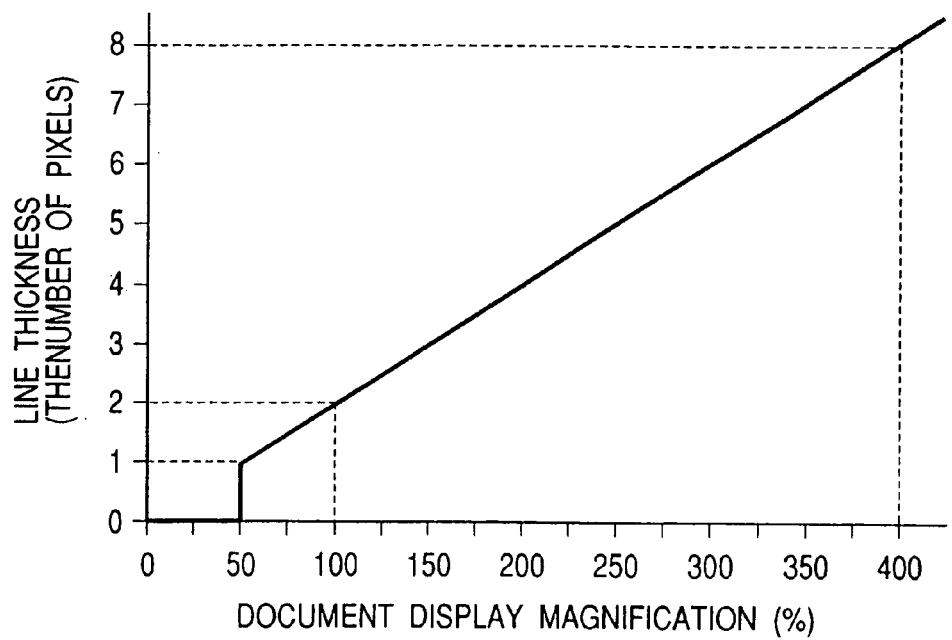
FIG. 14 is an explanatory view of the relation between the document output magnification and the object size stored in the function memory part shown in FIG. 2 during the initial setting.

FIGS. 13 and 14 are explanatory views showing the relation between the document output magnification and the object size stored in the function memory part 29 shown in FIG. 2 during the initial setting (in this example, the object is a diagram), the axis of ordinate indicates a line thickness (The Number Of Pixels), and the axis of abscissa indicates a document display magnification (%).

For example, in the diagram object, as shown in FIGS. 13 and 14, the thickness of the line constituting the diagram may be set as the object size.

As described above, in the document processing system of the present embodiment, the document file can be prepared, edited, and outputted in which the output size of each object during the enlargement/reduction of the document at the arbitrary magnification is arbitrarily determined for one object or a plurality of objects.

Second Embodiment

In the above-described first embodiment, the example of the document processing apparatus having a function of preparing, editing, and outputting the document has been described, but the present invention can be applied even to a document processing apparatus which only has a function of reading and outputting the document prepared and edited by the other document processing system by the LAN 16, the FD 17, and the like. The embodiment will be described hereinafter.

Figure 15:
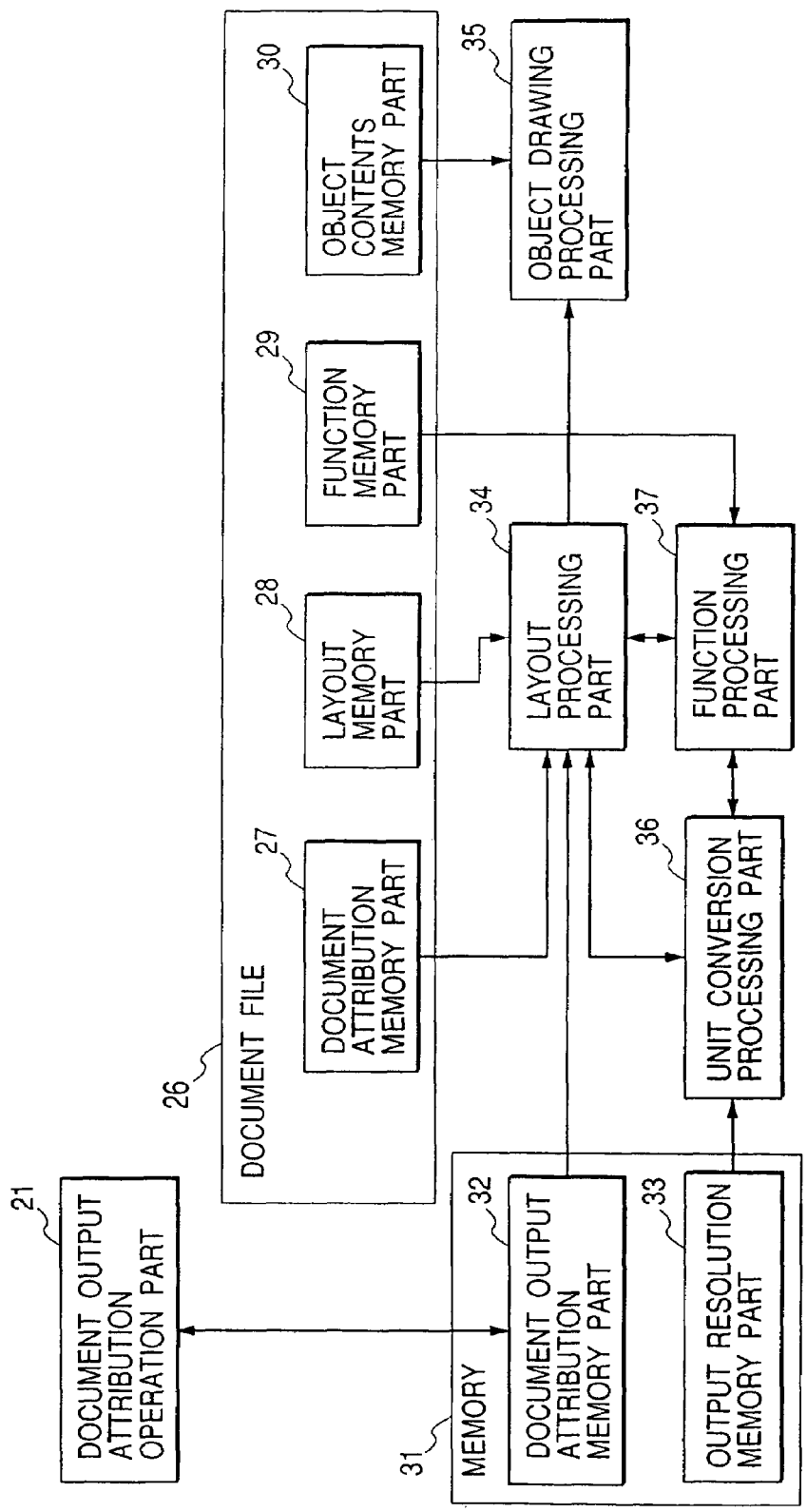
FIG. 15 is a block diagram showing the function constitution of the document processing apparatus according to a second embodiment of the present invention.

FIG. 15 is a block diagram showing the function constitution of the document processing apparatus according to a second embodiment of the present invention, and the same parts as those of FIG. 2 are denoted with the same reference numerals. Additionally, since the function of each part is the same as that of FIG. 2, the description thereof is omitted.

This can inexpensively provide a simple-constitution, simple-operation system.

Third Embodiment

In the above-described first and second embodiments, the case in which the function is defined during document preparation and stored in the document file has been described, but a function memory part 38 may be disposed on the memory 31 shown in FIG. 2, so that the function is defined by a function operation part 39 during document output and the object output size is corrected. The embodiment will be described hereinafter.

Figure 16:
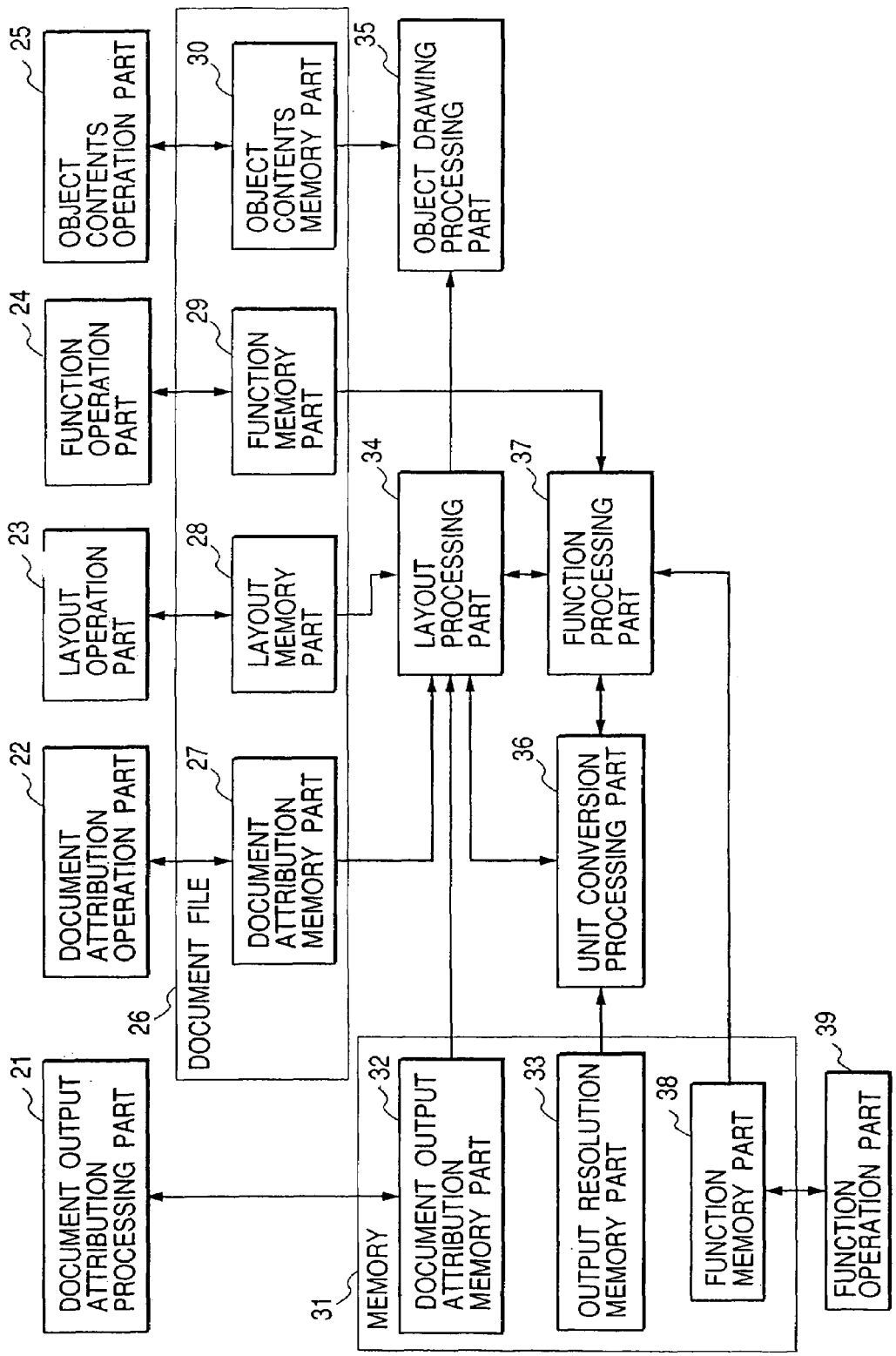
FIG. 16 is a block diagram showing the function constitution of the document processing apparatus according to a third embodiment of the present invention.

FIG. 16 is a block diagram showing the function constitution of the document processing apparatus according to a third embodiment of the present invention, and the same parts as those of FIG. 2 are denoted with the same reference numerals. Additionally, since the function of each part is the same as that of FIG. 2, the description thereof is omitted.

In FIG. 16, the function memory part 38 is disposed on the memory 31, the function is defined by the function operation part 39 when the document is outputted, and the object output size is corrected.

Figures 17, 18:
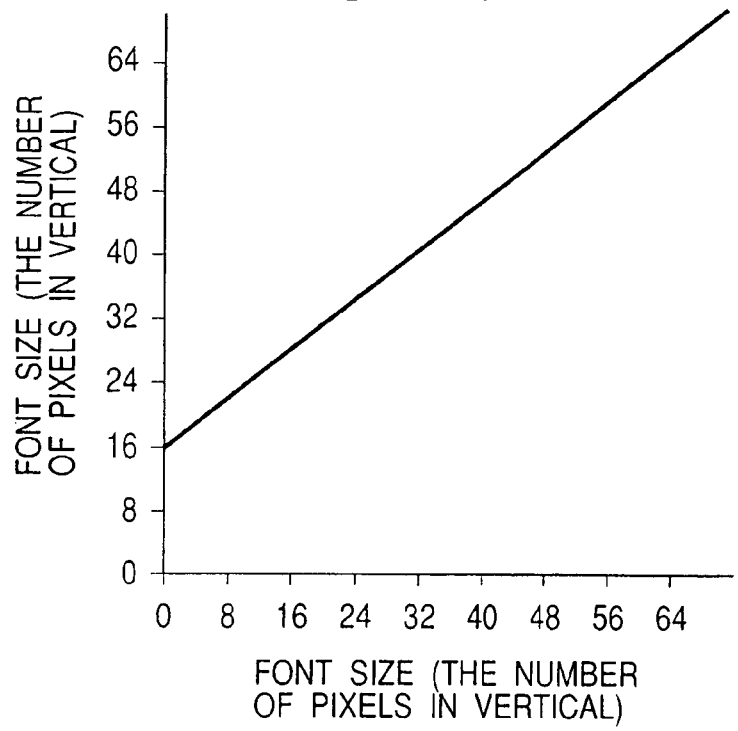
FIG. 17 is an explanatory view showing the output relation of a font stored in the function memory part shown in FIG. 2 in the document processing apparatus shown in FIG. 16.
FIG. 18 is an explanatory view of a memory map of a memory medium which stores various data processing programs readable in the document processing apparatus of the present invention.

Specifically, in the first or second embodiment or the conventional document processing system, the output size of each object is determined, but in the third embodiment, the output size is further changed, and the function for obtaining a new actual output size is defined as shown in FIG. 17.

FIG. 17 is an explanatory view showing the font output relation stored in the function memory part 29 shown in FIG. 2 in the document processing apparatus shown in FIG. 16, and the axes of ordinate and abscissa indicate the font size (The Number Of Pixels In Vertical).

For example, by performing correction as shown by the graph of FIG. 17, a small object can be outputted with a large size.

Thereby, the object size can also be corrected in accordance with the eyesight of a person who sees the document.

Moreover, when the person who sees the document selects the object, desired retrieval conditions are used and a plurality of objects are selected, so that the object to be seen can largely be displayed.

According to the above-described embodiment, there is provided an effect that the control of displaying the object in an enlarged or a reduced manner or not displaying the object can finely be performed for each arbitrary object or each arbitrary document display magnification.

The constitution of a data processing program which can be read by the document processing apparatus of the present invention will be described hereinafter with reference to a memory map shown in FIG. 18.

FIG. 18 is an explanatory view of the memory map of a memory medium storing various data processing programs which can be read by the document processing apparatus according to the present invention.

Additionally, as not especially shown, information for managing a group of programs stored in the memory medium, such as version information, and a person who prepares the program, are stored, and the information dependent on OS, and the like on the side of program reading, such as an icon for identifying/displaying the program, are stored in some cases.

Furthermore, data belonging to various programs are also managed by the above-described directory. Moreover, a program for installing various programs to the computer, a program for thawing the compressed program to be installed, and the like are stored in some cases.

In the present embodiment the function shown in FIG. 3 may be implemented by a host computer in accordance with the program installed from the outside. Furthermore, in this case, the present invention is applied even when a group of information including the program is supplied to the output apparatus from the memory media such as CD-ROM, flash memory and FD or from the external memory medium via a network.

As described above, it goes without saying that the object of the present invention is also achieved by supplying the memory medium in which the software program code for realizing the above-described function of the embodiment is stored to the system or the apparatus and reading and executing the program code stored in the memory medium by the computer (or CPU or MPU) of the system or the apparatus.

In this case, the program code itself read from the memory medium realizes a new function of the present invention, and the memory medium storing the program code constitutes the present invention.

As the memory medium for supplying the program code, for example, a floppy disk, hard disk, optical disk, optomagnetic disk, CD-ROM, CD-R, magnetic tape, nonvolatile memory card, ROM, EEPROM, and the like can be used.

Moreover, when the program code read by the computer is executed, the above-described function of the embodiment is realized, but additionally it goes without saying that there is also included a case in which the operating system (OS) operating on the computer, and the like perform a part or the whole of an actual processing based on the instruction of the program code so that the above-described function of the embodiment is realized by the processing.

Furthermore, it goes without saying that there is also included a case in which after the program code read from the memory medium is written into the memory disposed in a function expansion board inserted into the computer or a function expansion unit connected to the computer, CPU, and the like disposed in the function expansion board or the function expansion unit perform a part or the whole of the actual processing based on the instruction of the program code so that the above-described function of the embodiment is realized by the processing.

As described above, according to the present embodiment, when the arbitrary output magnification for the document data is designated, the output size of each object can individually be determined from the stored function information. Even when the output magnification is a reduction magnification, the specific object in the document data can be emphasized in size to be conspicuous without using the tuning magnification, and the object desired by the user can be outputted with the output size whose function is determined from the output magnification of the document data.

Moreover, according to the present embodiment, by a simple operation of forming the stored function information into a graph, outputting the graph via the output apparatus, and designating a specific point on the outputted graph, the user replaces the information with the intended function, and can freely correct the relation between the output magnification and the object size to be outputted.

Therefore, there is produced an effect that the univocal output size restriction of the output size of different types of objects is eliminated for the set output magnification, the output size of the object intended by the user can freely be determined, and different output sizes can be outputted in accordance with the function for selecting each object in the document data.

What is claimed is:

1. An information processing apparatus that comprises:

magnification determining means for determining a magnification of document data to be output when the document data is outputted to an output apparatus based on layout information;

function memory means for storing a function which defines a relation between a magnification of document data and a size of each of plural kinds of objects included in the document data, wherein sizes of each of plural kinds of objects are not always in proportion with available magnifications on the function and the plural kinds of objects include characters and objects other than characters;

object size determining means for determining a size of each of the objects to be output by applying the magnification determined by said magnification determining means to the function stored in said information memory means;

size changing means for changing the size of each of the objects based on each size determined by said object size determining means, respectively; and control means for outputting each of the objects with the size determined by said object size determining means to the output apparatus.

2. The information processing apparatus according to claim 1, wherein said function memory means stores respective functions for the plural kinds of objects.

3. An information processing method that comprises:
- a magnification determining step of determining a magnification of document data to be output when the document data is outputted to an output apparatus based on layout information;
- an object size determining step of determining a size of objects to be output by applying the magnification determined in said magnification determining step to a function which defines a relation between a magnification of document data stored in information memory means and a size of each of plural kinds of objects included in the document data, wherein sizes of each of plural kinds of objects are not always in proportion with available magnifications on the function, and wherein the plural kinds of objects include characters and objects other than characters;
- a size changing step of changing the size of each of the objects based on each size determined in said object size determining step, respectively; and
- an output step of outputting each of the objects with the size determined in said object size determining step to the output apparatus.

4. The information processing method according to claim 3, wherein said object size determining step uses plural functions for the plural kinds of objects.

5. A computer readable medium storing a computer-readable program for implementing an information processing method, wherein the method comprises:
- an magnification determining step of determining a magnification of document data to be output when the document data is outputted to an output apparatus based on layout information;
- an object size determining step of determining a size of objects to be output by applying the magnification determined in said magnification determining step to a function which defines a relation between a magnification of document data stored in information memory means and a size of each of plural kinds of objects included in the document data, wherein sizes of each of plural kinds of objects are not always in proportion with available magnifications on the function, and wherein the plural kinds of objects include characters and objects other than characters;
- a size changing step of changing the size of each of the objects based on the size determined in said object size determining step, respectively; and
- an output step of outputting each of the objects with the size determined in said object size determining step to the output apparatus.

6. The computer readable medium according to claim 5, wherein said object size determining step uses plural functions for the plural kinds of objects.

* * * * *

UNITED STATES PATENT AND TRADEMARK OFFICE
CERTIFICATE OF CORRECTION

PATENT NO. : 7,417,761 B2
APPLICATION NO. : 11/346385
DATED : August 26, 2008
INVENTOR(S) : Kazuhiro Matsubayashi It is certified that error appears in the above-identified patent and that said Letters Patent is hereby corrected as shown below:

COLUMN 5:
Line 22, "These" should read --These items of--.
Line 31, "These" should read --These items of--.

COLUMN 6:
Line 41, "cab" should read --can--.
Line 66, "numerical" should read --numeral--.

Signed and Sealed this

Tenth Day of February, 2009

JOHN DOLL
*Acting Director of the United States Patent and Trademark Office*